United States Patent
Mail

[15] 3,698,554
[45] Oct. 17, 1972

[54] METHOD FOR BACKWASHING FILTERS

[72] Inventor: Isaac Paul Mail, P.O. Drawer, Tulsa, Okla. 74101

[22] Filed: April 27, 1970

[21] Appl. No.: 31,935

Related U.S. Application Data

[62] Division of Ser. No. 737,721, June 17, 1968, abandoned.

[52] U.S. Cl. ..................210/80, 210/82, 210/274, 210/275
[51] Int. Cl. ..........................B01d 23/24, B01d 29/08
[58] Field of Search..................210/80, 274, 82, 275

[56] References Cited

UNITED STATES PATENTS

| 1,069,737 | 8/1913 | Stevenson..............210/274 X |
| 3,468,422 | 9/1969 | Camp........................210/274 |
| 3,512,649 | 5/1970 | Nebolsine et al..........210/274 |

Primary Examiner—Samih N. Zaharna
Attorney—Arthur L. Wade

[57] ABSTRACT

A filter bed is backwashed in a batch operation with backwash fluid and gas to dislodge particulates from the bed. The flow of gas is terminated, and the gas is flushed from the bed by additional amounts of backwash fluid. After a settling period, the backwash fluid and the dislodged particulates are siphoned from above the filter bed.

2 Claims, 2 Drawing Figures

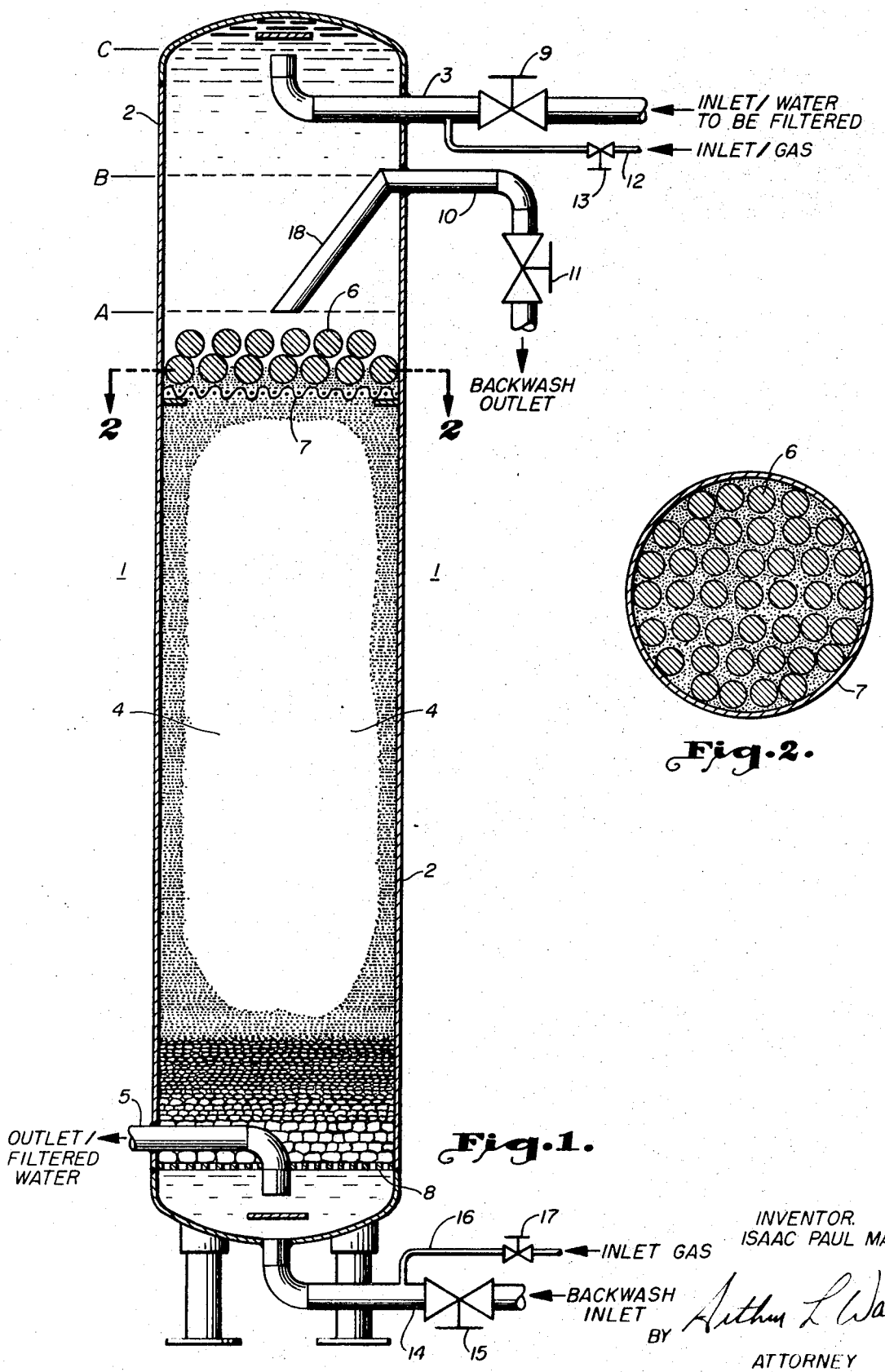

3,698,554

METHOD FOR BACKWASHING FILTERS

BACKGROUND OF THE INVENTION

1. Field of the Invention:

This application is a division of application Ser. No. 737,721, filed June 17, 1968 and now abandoned. A continuation-in-part of Ser. No. 737,721 was filed Aug. 8, 1969, and is Ser. No. 857,266.

The present invention relates generally to filtering apparatus and more particularly is directed to improvements in cleaning by backwashing of filtering apparatus of the downflow type; that is, in improvements in a backwashing operation by a novel method of batching in the individual backwash cycles in filtering apparatus in which the liquid to be filtered is passed downwardly through a filter bed of granular solids.

2. Description of the Prior Art

In filtering apparatus presently in use, the liquid to be filtered and backwash liquids have been passed both upwardly as well as downwardly through a filter bed of granular solids. There are advantages and disadvantages associated with each flow pattern.

It is presently accepted that with a downflow pattern, the particulates are removed from the liquid near the upper surface of the bed and collect in a "cake" which is supported by the lower bed. This cake quickly increases the pressure drop in the downflowing liquid which is a common index for limiting the filter cycle.

It is also presently accepted to backwash a filter bed within a vessel by continuously passing washing liquid through the bed in a direction opposite to the direction of filtering flow. The velocity of the liquid must be great enough to expand the bed so as to dislodge the filtered particulates from the bed material. The total quantity of liquid required to return the bed to serviceable cleanliness is large.

SUMMARY OF THE INVENTION

A principal object of the invention is to direct liquid to be filtered downwardly into a bed of granular material and impart enough kinetic energy to the particulates to cause them to penetrate the bed to a desired depth, and then to backwash the bed in an improved manner with fluids directed upward through the bed.

Another object is to backwash the bed of granular material in a batch operation and employ gas bubbles to agitate the bed material to aid in dislodgement of particulates deposited in the bed, and then to terminate the flow of gas and purge the bubbles still entrained within the bed by flowing additional fluid upward through the bed.

Another object is to effect a reconsolidation of the filter bed, following the liquid purge of gas from the bed, by allowing bed material to settle out of the backwash fluid for a predetermined time before removal of backwash fluids from the vicinity of the bed.

The present invention contemplates a vessel having a bed of solid granular material supported therein and arranged to receive a downward flow of liquid from which it is desired to remove particulates. A structure is mounted near the upper portion of the bed which will form multiple vertical passages extended below the upper surface of the bed and whose total cross-sectional area is substantially less than the cross-sectional area of the vessel. This reduction of the cross-sectional area results in the downflowing liquid increasing in velocity as it flows through the multiple passages. The increased velocity imparts to the particulates sufficient kinetic energy to cause them to penetrate into the bed a predetermined depth.

The invention further contemplates a unique method of cleaning the bed of particulates removed from filtered liquid. The bed is physically arranged spaced from the upper end of its vessel. Backwash liquid is then passed upwardly through the bed to partially fill the space above the bed. Gas bubbles are concurrently passed up through the bed with the liquid to facilitate agitation of the bed which will dislodge particulates. After the space is partially filled with backwash liquid, the supply of gas is discontinued. The flow of backwash liquid is continued to purge the bubbles from the bed. Any dislodged bed material is settled back into the bed. The liquid above the bed, with the particulates entrained therein, is then removed. The cycle may be repeated until the particulate contamination of the bed has been satisfactorily reduced.

Other objects, advantages and features of this invention will become apparent to one skilled in the art upon consideration of the written specification, appended claims, and attached drawing, wherein;

FIG. 1 is a sectioned schematic elevation of a filtering apparatus including the present invention; and FIG. 2 is a plan view of FIG. 1 taken along the line 2—2.

DESCRIPTION OF THE PREFERRED EMBODIMENT

Basic Structural Arrangement

FIG. 1 discloses the subject invention embodied in the filtering apparatus generally identified by the numeral 1. All of the structure of the apparatus centers about the vertically extended vessel 2. The filtering apparatus disclosed herein is of the downflow type. The raw influent is introduced into vessel 2 through conduit 3 for downward passage through filter bed 4, while the effluent filtrate is withdrawn from the base of vessel 2 through conduit 5. Also within the vessel 2 is a layer of smooth-surfaced bodies 6 supported by a wire mesh screen 7 and a perforated support structure 8 for bed 4.

The contaminated, or raw, influent entering vessel 2 through conduit 3 is given a predetermined flow rate. Since the velocity of the influent through the filtering medium is the critical variable in the design of the apparatus, the total cross-sectional area of the flow paths to the top surface of the filter bed 4 between bodies 6 (and hence the diameter of the vessel) is sized dependent upon this flow rate.

Tests of a Conventional System

Tests were conducted using a filter medium of granular solids now commonly employed in treating water associated with oil production and water produced from water supply wells for injection purposes in secondary recovery operations. The particulate material and size was that also found in such produced waters.

It was observed during this testing that flow velocity normally developed allowed the particulates to form a filter cake of low permeability to the influent on the top surface of the filter medium. The filter medium then became merely a support for this filter cake, and the cake, in effect, became the filter medium. These velocities are conventionally less than 2 ft/min, and were ordinarily 0.3 to 0.5 ft/min.

This continuing build-up of a filter cake on top of the medium results in an increasing pressure differential across the filtering apparatus, a decreasing throughput, and the need for frequent cleaning of the filter.

Basic Filtering Operation

The influent moves downwardly through the vessel 2 to the layer of smooth-surfaced bodies 6 supported by wire mesh screen 7. Screen 7 extends across the cross-sectional area of vessel 2 and is situated below the top surface of the filter bed 4.

The layer of bodies 6 forms a restriction to the flow of fluid through the full diameter of vessel 2. The influent must flow through the paths formed by the spaces between the bodies. These spaces form restrictive paths to the flow and, in effect, act as jets or nozzles. This jetting action increases the flow velocity of the influent at the surface of the filter medium 4 into a desired range.

Experiment established that the lower of the bodies 6 must be at least partially below the upper surface of the filter bed as shown in FIG. 1. From another view, the upper surface must extend up into the restrictive paths formed by the spaces between the bodies 6 which act as jets or nozzles. If the bed surface is at, or below, the lower surface formed by bodies 6, the objectionable filter cake will build up on the top of the filter bed with the disadvantages found in the prior art.

With the bed 4 and bodies 6 in correct positional relation, the desired range of flow rate of the influent imparts increased kinetic energy to the particulates in the liquid and drives the particulates below the upper boundary of the filter medium. At the surface of the filter bed, the bed does become saturated with particulate material, but other particulates will nevertheless be carried into lower unsaturated portions of the filter bed with their increased kinetic energy. The formation of a low permeability filter cake on the surface of the filter medium is thus obviated.

This filtration phenomenon has been analogized to adsorbent system mechanics. The zone through which any particulate will travel before being stopped is comparable to the mass transfer zone of an adsorbent system. Bed depths are designed to accommodate and exceed the length of the "mass transfer" zones created by the particular flow velocity anticipated.

The bodies 6 function to reduce the cross-sectional area of the conduit (vessel 2) at the upstream surface boundary of the filter medium. This reduction in area increases the flow velocity of the contaminated influent at this boundary, and causes the influent to move across the boundary region and into the medium.

Also, although spherical bodies 6 are disclosed, it is apparent that other means are available to impart the desired velocity gain to the influent at the upper boundary of the filter bed. Although there are many forms this structure could take to carry out the objectives of the invention, they should all produce a jetting effect which will drive the particulates down into the bed and permit the ready return of displaced bed particles. Further, the upper boundary of the bed must extend up into the passages formed by the structure producing the jetting effect to obviate formation of a filter cake.

It is obvious that the smooth-surface bodies 6 could take a variety of shapes and materials. For example, they could be oblate or elongate spheroidal, or irregularly rounded (as smooth river stones). They could be formed from ceramic, glass, plastic, or metallic material. It is only imperative that they reduce the cross-sectional area of vessel 2 sufficiently to impart adequate velocity to the flow, without themselves being so small or so rough-surfaced as to initiate the filtering action.

It is noted that flow velocities above a certain value will expand or disrupt the granular or sand-type filter medium depicted in FIG. 1. Velocities in this range exert sufficient pressure on the filter bed surface to produce a coning, channeling, or drilling effect which will reduce the effectiveness of the filter bed. Velocities on the order of 7 ft/min (the high range of those tested) did not expand or disrupt the filter medium under test, however.

Backwashing

After the bed 4 is saturated with particulates by the novel arrangement disclosed above, the filtered material entrained in the bed must be periodically removed. It has been common practice to simply introduce a liquid beneath the bed and flow the liquid upward with a velocity sufficient to dislodge the particulates. Gas has also been introduced up through the bed to agitate it and thereby loosen the bond between the particulates and the bed material. Some expansion of the bed takes place and the velocity must be carefully controlled to avoid losing a significant portion of the bed material entrained in the backwash liquid. The present invention includes a method which provides the upflowing backwash liquid, with agitating gas, but without significant loss of bed material. Further, the quantity of backwash liquid required is low and the rate of flow of this liquid can be kept quite low.

Fundamentally, the method of the present invention includes employing a number of backwash cycles. A predetermined amount of liquid is passed up through the bed 4 to a predetermined level above the bed. Gas is used concurrently with the backwash liquid and/or in sequence with it. The predetermined amount of backwash liquid above the bed, with particulate material swept from the bed below, is then removed. Another amount of backwash liquid is again employed in the same manner and removed. This cycle is repeated enough times to reduce the bed contamination to the level desired for filtering service.

More specifically, referring to FIG. 1, when bed 4 is saturated by particulates the flow of liquid to be filtered is terminated. A valve 9 is indicated in conduit 3 for this control of flow into vessel 2.

The next step is to evacuate the upper portion of vessel 2 of liquid down to the bed 4. Horizontal index line A indicates this level near the top of the bed 4—bodies 6. Outlet conduit 10 is shown as available for this purpose, valve 11 in the conduit providing the control.

Valve 11 is opened and the liquid above the bed will flow out conduit 10 if the conduit is filled with liquid. However, if necessary to prime this siphon system, gas can be applied to the upper portion of vessel 2 through conduit 12. Valve 13 is provided in conduit 12 for control. The pressure of the gas will force the liquid up conduit 10 and through valve 11.

A backwash liquid, from a source not shown, is next conducted into the lower portion of vessel 2. Conduit 5 could be used for this purpose, but separate conduit 14 is shown to give clarity to the disclosure. Valve 15 is indicated in conduit 14 for this control.

Valve 11 in conduit 10 is closed, so the backwash liquid travels up through the bed 4 to dislodge particulate material from the bed. Gas is also flowed up bed 4. This gas is conducted into vessel 2 through conduit 16. This conduit is disclosed as arranged to introduce the gas into the backwash liquid of conduit 14 to back up the concept of flowing the gas concurrently with the backwash liquid. Valve 17 is provided in conduit 16 for control. The precise arrangement of these conduits and vessel 2 is not disclosed to limit the invention. The concept is to flow an amount of backwash liquid and gas up through bed 4 to raise the liquid level from level A to level B. Gas is to be used to supplement the agitating effect of the liquid. The gas may be used concurrent with the liquid or in sequence with it. After the agitation has driven a maximum amount of particulates into the liquid between levels A and B, additional backwash liquid is introduced through conduit 14 to flush the gas from the bed.

The higher liquid level is indicated at C, substantially the remaining portion of the vessel 2. The goal is to provide enough backwash liquid to flush the gas from bed 4 so that any bed material carried up into this vessel space can settle back to bed 4 by gravity. If the gas were not positively flushed from the bed, it would continue to break out and tend to retard settling of the bed material.

With level C reached by the backwash liquid in vessel 2, all fluids into the vessel are shut off for a period of time. Gravity causes the bed material to settle; this relatively fine material will slide over the smooth surface of bodies 6 and into the bed 4. There remains the particulate material dislodged into the backwash liquid and entrained in this liquid between levels A and C. The next step is to simply remove this material and go through another cycle of backwashing.

Valve 11 is opened and the contaminated backwash water is drawn from the vessel 2 at level A through the lower end of conduit section 18 which is the internal end of conduit 10 inserted into vessel 2. Conduit 10 is formed with section 18 extending downwardly to return any bed material to the vessel and prevent buildup in conduit 10 which might obstruct the outlet. This run of conduit upward will give a measurable opportunity for gravity to become effective during the settling period following agitation.

This method of running a batch of backwash liquid up through bed 4 can be repeated as often as required to clean bed 4. Obviously the valves controlling the conduits can be automated to carry out this method of cleaning. The positive, batch removal of backwash liquid requires less total liquid than would the continuous flow of such liquid to first purge the bed and then sweep the vessel above the bed clean.

From the foregoing it will be seen that this invention is one well adapted to attain all of the ends and objects herein set forth, together with other advantages which are obvious and which are inherent to the method.

It will also be seen that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A method of backwashing a filter bed of granular solids in a batch operation in each backwash cycle and in the order of steps recited, including,
   providing a space above the filter bed, sufficient to accommodate at least the backwash fluid used in one backwash cycle,
   flowing a predetermined amount of backwash fluid up through the bed to dislodge particulates from the bed,
   flowing gas up through the bed to agitate the bed and dislodge particulates from the bed,
   terminating the flow of gas and flowing an additional predetermined amount of backwash fluid up through the bed to flush gas from the bed,
   terminating the flow of backwash fluid, and providing a settling period for any bed material in the accumulation of fluid above the bed,
   and while the flow of the backwash fluid and gas remains terminated, discharging the accumulation of fluid with entrained particulates from above the bed through a discharge opening above the bed.

2. The method of claim 1, including,
   repeating the cycle of claim 1 until the bed is clean enough for filtering service.

* * * * *